(12) United States Patent
Kimura

(10) Patent No.: US 8,547,574 B2
(45) Date of Patent: Oct. 1, 2013

(54) INFORMATION PROCESSING APPARATUS AND METHOD FOR WIRELESS COMMUNICATION WITH OTHER INFORMATION PROCESSING APPARATUSES

(75) Inventor: Yoshio Kimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 924 days.

(21) Appl. No.: 12/388,213

(22) Filed: Feb. 18, 2009

(65) Prior Publication Data
US 2009/0207445 A1    Aug. 20, 2009

(30) Foreign Application Priority Data

Feb. 18, 2008    (JP) ................. 2008-036581

(51) Int. Cl.
*G06F 3/12*    (2006.01)
*G06F 15/16*   (2006.01)
*H04L 12/58*   (2006.01)
*H04J 3/24*    (2006.01)

(52) U.S. Cl.
USPC ........ 358/1.15; 455/412.1; 370/349; 709/235

(58) Field of Classification Search
None
See application file for complete search history.

(56) References Cited

U.S. PATENT DOCUMENTS

| 2002/0051172 A1 | 5/2002 | Nomura |
| 2003/0124978 A1* | 7/2003 | Virtanen ................. 455/41 |
| 2006/0031597 A1* | 2/2006 | Shieh .................... 710/10 |

FOREIGN PATENT DOCUMENTS

| JP | 2001-175432 | 6/2001 |
| JP | 2002-169665 | 6/2002 |
| JP | 2003-241911 | 8/2003 |
| JP | 2003-304249 A | 10/2003 |

OTHER PUBLICATIONS

Japanese Office Action dated May 10, 2012 for JP 2008-036581.

* cited by examiner

*Primary Examiner* — Thomas Lett
(74) *Attorney, Agent, or Firm* — Carter, DeLuca, Farrell & Schmidt, LLP

(57) ABSTRACT

A technique for providing a first information processing apparatus configured to acquire first identification information as information for identifying the information processing apparatus, searching for a second information processing apparatus capable of wireless communication, acquiring a second identification information as information for identifying the second information processing apparatus that was found, comparing the first identification information and the second identification information, changing the first identification information when the first identification information and the second identification information are identical, and notifying when the first identification information is changed.

12 Claims, 13 Drawing Sheets

F I G. 12
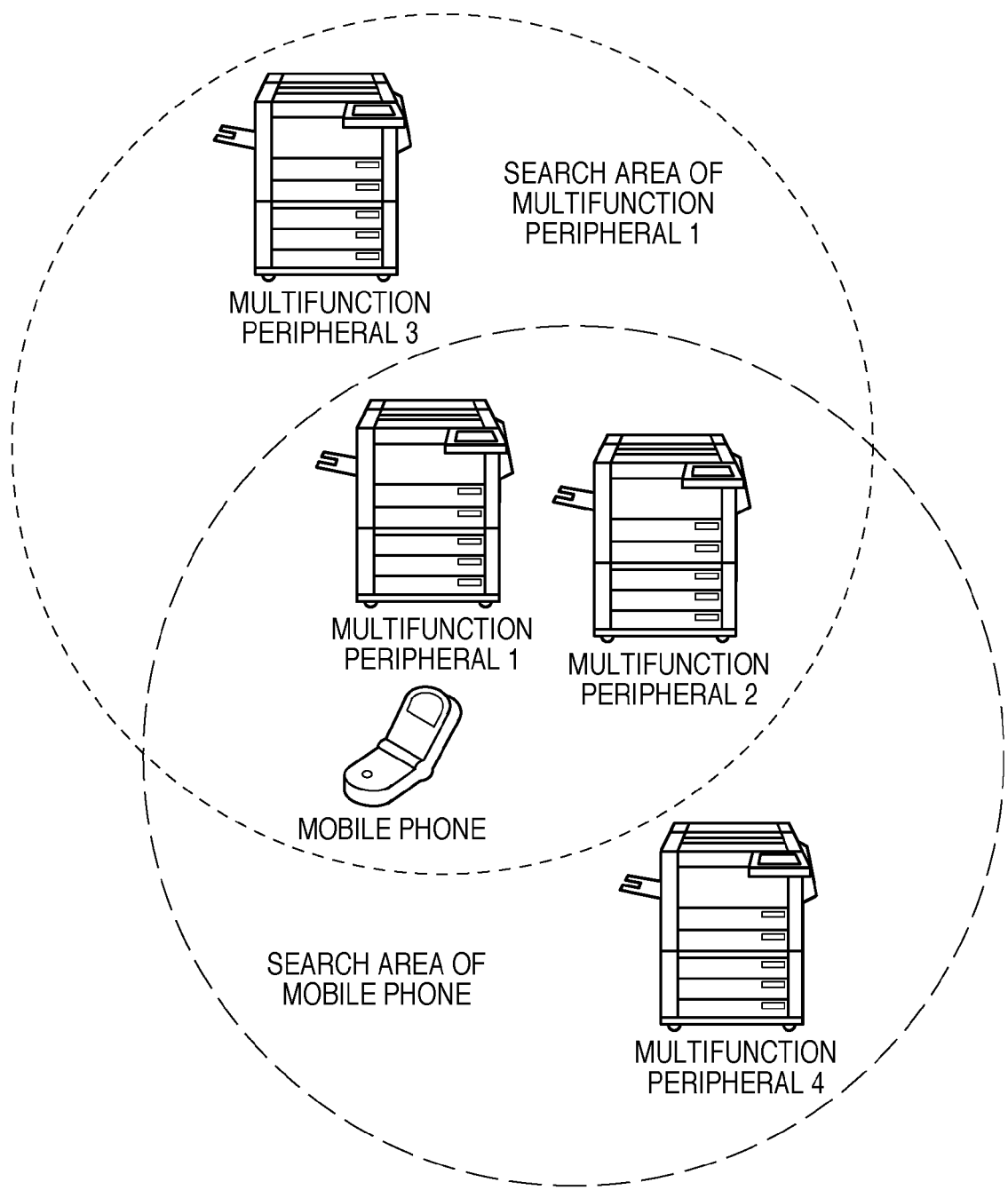

INFORMATION PROCESSING APPARATUS AND METHOD FOR WIRELESS COMMUNICATION WITH OTHER INFORMATION PROCESSING APPARATUSES

BACKGROUND OF THE INVENTION

1. Field of the Invention

The present invention relates to an information processing apparatus, more specifically, wireless communication and a control method.

2. Description of the Related Art

Development of information processing apparatuses capable of wireless communication has seen remarkable progress in recent years, and for example, mobile phones with various functions in addition to telephone functions are emerging. Some mobile phones are capable of transmitting/receiving email, browsing websites, displaying documents of various formats such as PDF documents, Word® documents and Power Point® documents, etc.

As information processing apparatuses become multifunctional, a demand is growing for, for example, printing documents in various formats stored in mobile phones. In response to this growing demand, for example, Japanese Patent Laid-Open Nos. 2001-175432, 2002-169665, and 2003-241911 propose various techniques for direct printing from mobile phones.

However, in the case of using omnidirectional communication such as Bluetooth communication as a wireless communication technique, when data is transmitted from a mobile phone to the desired printing apparatus, there is a possibility that the data may be transmitted to another printing apparatus.

In addition, when performing omnidirectional wireless communication such as Bluetooth communication, ordinarily, the data transmitting side searches for Bluetooth devices, selects a desired device from a list in which device names are listed, and after the connection is established, data transfer is performed. In the list displayed at this time, device names that have been set freely for each device are listed, and by default, usually, product names are listed. That is, if a plurality of the same products is present in the same area, that product name will appear in duplicate in the list.

Furthermore, it is often the case that a desired device is once specified through a search or the like and registered, and the registered device is used from the next time onwards. In this case, in order to establish a connection to a device that is not registered, some kind of procedure is necessary, but it does not work out well particularly for the case where printing is performed from an unspecified device, such as when printing is performed from a mobile phone.

SUMMARY OF THE INVENTION

An embodiment of the present invention allows realization of a more easy-to-use wireless communication technique.

According to an aspect of the present invention, the foregoing problem is solved by providing a first information processing apparatus including a first acquiring unit configured to acquire first identification information for identifying the first information processing apparatus, a search unit configured to search for a second information processing apparatus that is capable of wireless communication with the first information processing apparatus, a second acquiring unit configured to acquire second identification information for identifying the second information processing apparatus found by the search unit, a comparing unit configured to compare the first identification information and the second identification information, a change unit configured to change the first identification information when the first identification information and the second identification information are identical, and a notification unit configured to notify a user of the changed first identification information.

According to another aspect of the present invention, the foregoing problem is solved by providing a control method of a first information processing apparatus capable of wireless communication with a second information processing apparatus, the method including acquiring first identification information as information for identifying the first information processing apparatus, searching for the second information processing apparatus capable of wireless communication, acquiring second identification information as information for identifying the second information processing apparatuses found in the searching step, comparing the first identification information and the second identification information, changing the first identification information when the first identification information and the second identification information are identical, and notifying when the first identification information is changed.

Further features of the present invention will be apparent from the following description of exemplary embodiments with reference to the attached drawings.

BRIEF DESCRIPTION OF THE DRAWINGS

FIG. 12 is a diagram illustrating an example of a concept regarding the search area of an image forming system according to an embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
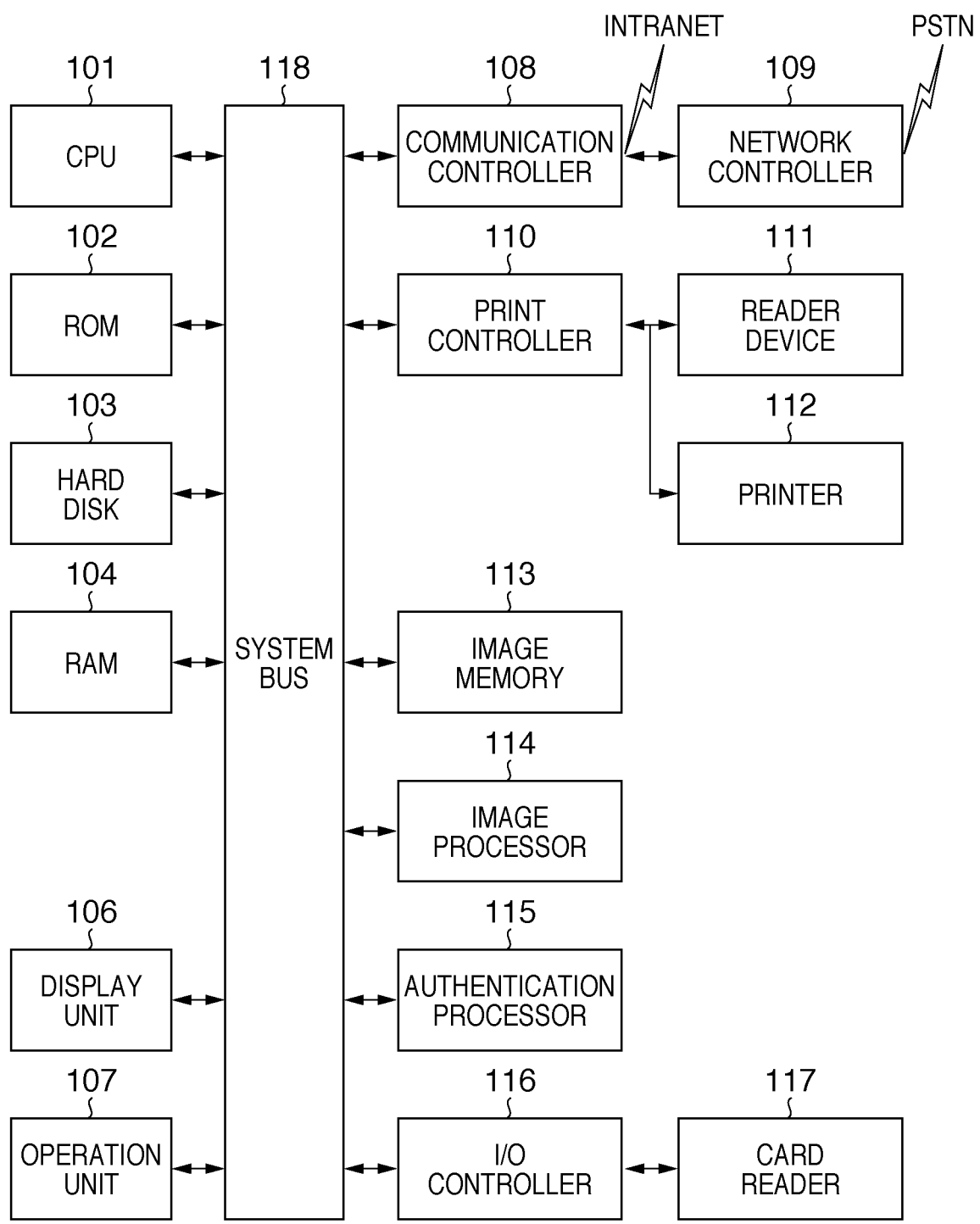
FIG. 1 is a block diagram illustrating a general configuration of a multifunction peripheral.

FIG. 1 is a block diagram illustrating a schematic configuration of a multifunction peripheral as a printing apparatus according to an exemplary embodiment of the present invention. The multifunction peripheral includes a central processing unit (CPU) 101, a read only memory (ROM) 102, a hard disk 103, and a random access memory (RAM) 104. The ROM 102 stores various information including driving conditions, management data, etc. for various units of the apparatus connected to a system bus 118. The RAM 104 stores data necessary for operations. The CPU 101 executes various processes in accordance with the stored control programs.

The multifunction peripheral further includes a display unit 106, an operation unit 107, a communication controller 108, a print controller 110, an image memory 113, an image processor 114, an authentication processor 115, an I/O controller 116, and so on.

The display unit 106 displays various information such as driving conditions, apparatus status, or input information. The operation unit 107 can be keys including a numerical keypad, a start key and so on through which a user can enter input such as settings and instructions, or can be a touch panel or the like that is partially included within the display unit 106. The communication controller 108 connects to the Internet or an intranet via a wireless or wired network, and transmits/receives document data including image data as well as control commands. Also, the communication controller 108 has a wireless communication controller (not shown), and is configured to be capable of performing wireless communication with mobile terminals. The communication methods include Wireless Fidelity (Wi-Fi), Bluetooth, etc.

The network controller 109 connects to a public switched telephone network (PSTN), executes a predetermined line control when signals are outgoing/incoming, and connects or disconnects from the line. Image data and control signals are modulated/demodulated by a built-in modem device, and then transmitted/received as facsimiles via the network controller 109. A reader device 111 reads image data by irradiating light onto a paper document to be transmitted, copied, or stored, and converting the light reflected from the image into a corresponding electric signal. The read image data is transmitted, copied, or stored via the print controller 110.

A printer 112 receives image data or image data from an information source such as the reader device, a client computer or the like via the print controller 110, forms the data on recording paper as a permanent visible image, and ejects the recording paper. The image memory 113 temporarily stores the read or received image data or image data. The image memory 113 may be included within the hard disk 103 or the RAM 104, depending on the device, status, and so on.

An image processor 114 compresses and encodes image data to be transmitted. The image processor 114 also decompresses and decodes received image data, converts received image data into image data, and converts image data to be stored into an appropriate format or a format specified by a user (e.g., PDF format, etc.). The image processor 114 also performs, if required, an image correction process in response to the optical response characteristics of the reader device 111 and inconsistencies between senders, an image rendering process such as an image scaling process in response to input from the user through the operation unit 107, an image optimization process according to the write characteristics of the printer 112 on the image data, etc.

The authentication processor 115 authenticates print jobs, in addition to authenticating users, workgroups, and the like. A card reader 117 is provided to transmit/receive commands and data to/from contactless IC cards (also called chip cards or smart cards) by using a short range wireless communication technique such as NFC. The card reader 117 transmits or communicates data such as user information via the I/O controller 116. Although not shown, the card reader 117 includes a portion (antenna) over which a contactless card is waved.

The system bus 118 connects the CPU 101, the ROM 102, the hard disk 103, the RAM 104, the display unit 106, the operation unit 107, the communication controller 108, the print controller 110, the image memory 113, the image processor 114, the authentication processor 115 and the I/O controller 116.

The multifunction peripheral of the present embodiment as configured above has a facsimile communication function for transmitting read image data, a forwarding function for forwarding data to a document management server computer, and a copying function for printing/outputting read image data. The multifunction peripheral further has a receiving function for receiving image data via facsimile, and a printing function for receiving print data from a client computer and printing the print data. Accordingly, the multifunction apparatus can be used not only as a copy machine, but also as a facsimile apparatus, a printer apparatus, and a scanner apparatus.

The printer 112 can be, for example, an inkjet type, thermal head type, dot impact type, or any other type, instead of an electrophotographic recording type.

Figure 2:
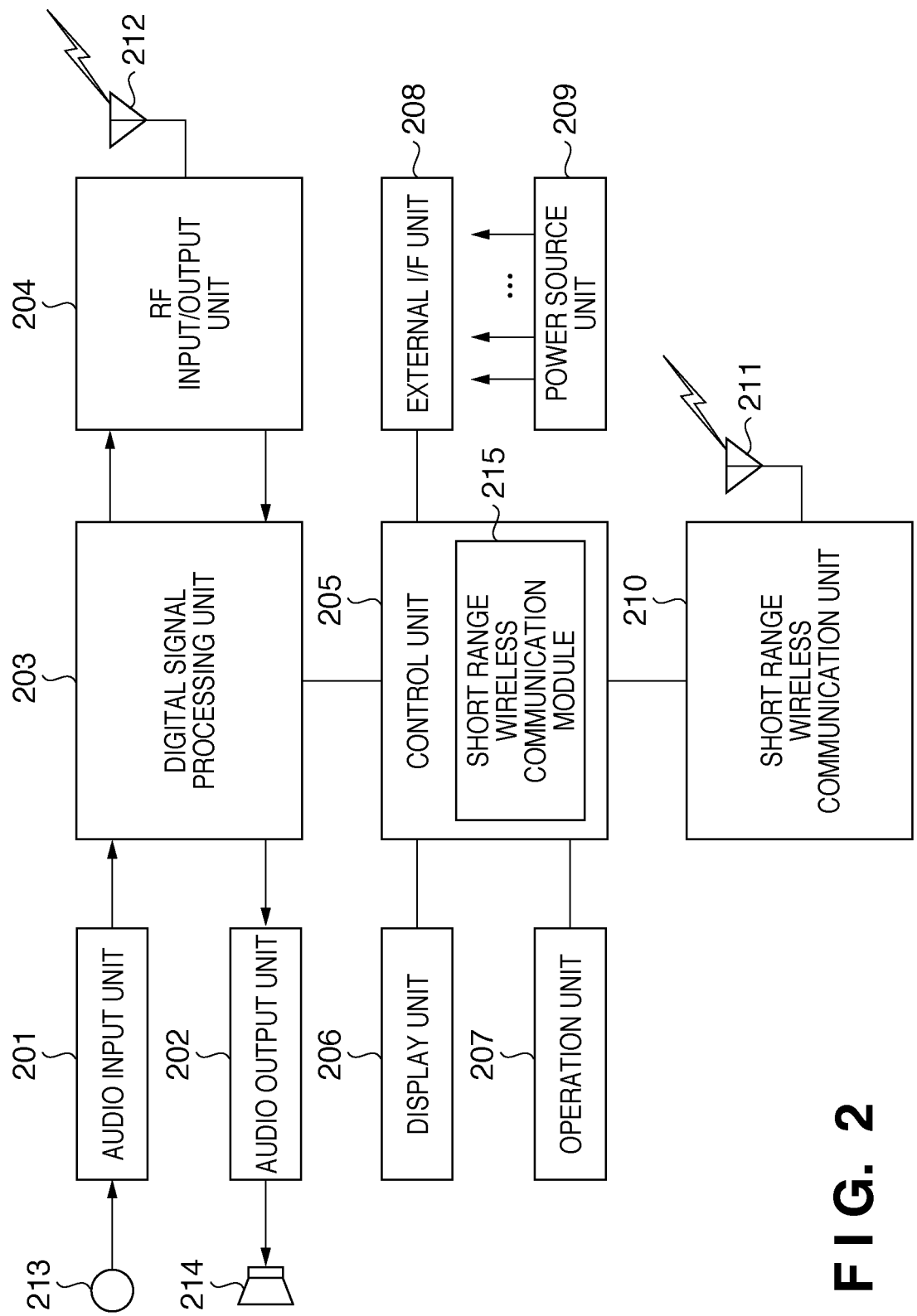
FIG. 2 is a block diagram illustrating a schematic configuration of a generic mobile phone with a short range wireless communication function.

FIG. 2 is a block diagram illustrating a schematic configuration of a mobile phone with a short range wireless communication function that is a portable terminal according to an embodiment of the present invention. The present embodiment will be described taking the configuration below as an example, but it should be understood that the present invention is not specifically limited to the present embodiment, and is applicable to devices capable of information communication in various forms.

The mobile phone includes a control unit 205 as a primary unit, and further includes a digital signal processing unit 203, a display unit 206, an operation unit 207, an external I/F unit 208, and a short range wireless communication unit 210 that are connected to the control unit 205.

The control unit 205 is a primary unit for achieving the functions of the mobile phone, and includes a CPU, an EEPROM, a flash memory, a SRAM, and so on. In the present embodiment, the control unit 205 further includes a short range wireless communication module 215 for transmitting/receiving commands and data to/from the short range wireless communication unit 210.

The digital signal processing unit 203 is connected to an audio input unit 201 to which a microphone 213 is connected, an audio output unit 202 to which a speaker 214 is connected, and an RF input/output unit 204 to which an antenna 212 is connected, and performs encoding of digital audio signals and decoding into digital audio signals.

The audio input unit 201 converts analog audio signals inputted from the microphone 213 into digital signals. The audio output unit 202 is provided to amplify received digital audio signals to drive the speaker. The RF input/output unit 204 performs high frequency transmission/reception.

The display unit 206 outputs a display of information to the user, and is configured with an LCD driver, an LCD display device and the like. The operation unit 207 is provided to enter operation information into the mobile phone 200 from the user. The external I/F unit 208 provides an interface to external apparatuses, and is configured with a 16-pin connector or the like.

A power source unit 209 generates and supplies electricity necessary for each block from a battery power source.

The short range wireless communication unit 210 is connected to the short range wireless communication module 215 of the control unit 205, and transmits/receives data to/from external terminals via the antenna 211.

The short range wireless communication module 215 is built into part of the control unit 205, and controls a communication function by exchanging commands when Bluetooth communication is used as the short range wireless communication.

Figure 3:
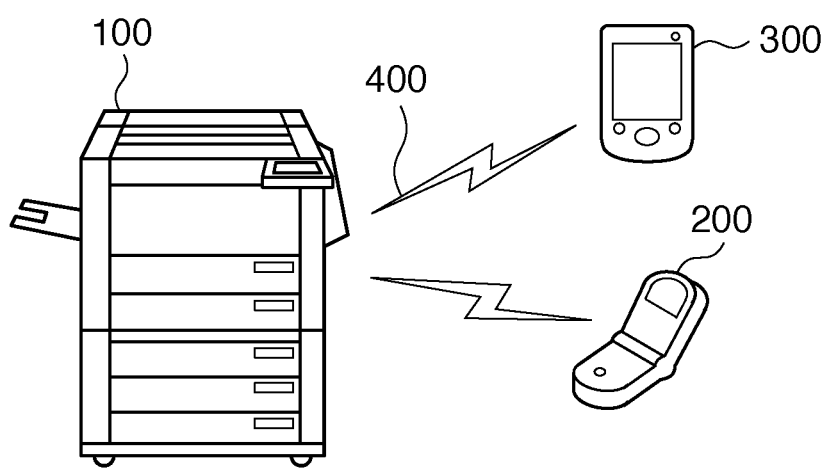
FIG. 3 is a diagram illustrating a configuration of an image forming system according to an embodiment of the present invention.

FIG. 3 is a diagram illustrating a configuration of an image forming system according to an embodiment of the present invention. In FIG. 3, a mobile phone 200 and a PDA 300 are shown as exemplary portable terminals used by general users.

Reference numeral 100 denotes a multifunction peripheral connected to the mobile phone 200 and the PDA 300 via a wireless communication medium 400. The wireless communication medium 400 can include wireless communication technologies such as Wi-Fi and Bluetooth.

It should be noted that FIG. 3 merely shows a conceptual diagram of a general configuration, and therefore it goes without saying that the portable terminals used by general users can be other mobile information devices. Furthermore, reference numeral 100 is not necessarily a multifunction peripheral, and a configuration is of course possible in which separate devices, such as a printer and a fax, are connected to the portable terminals via the wireless communication medium 400.

Figure 4:
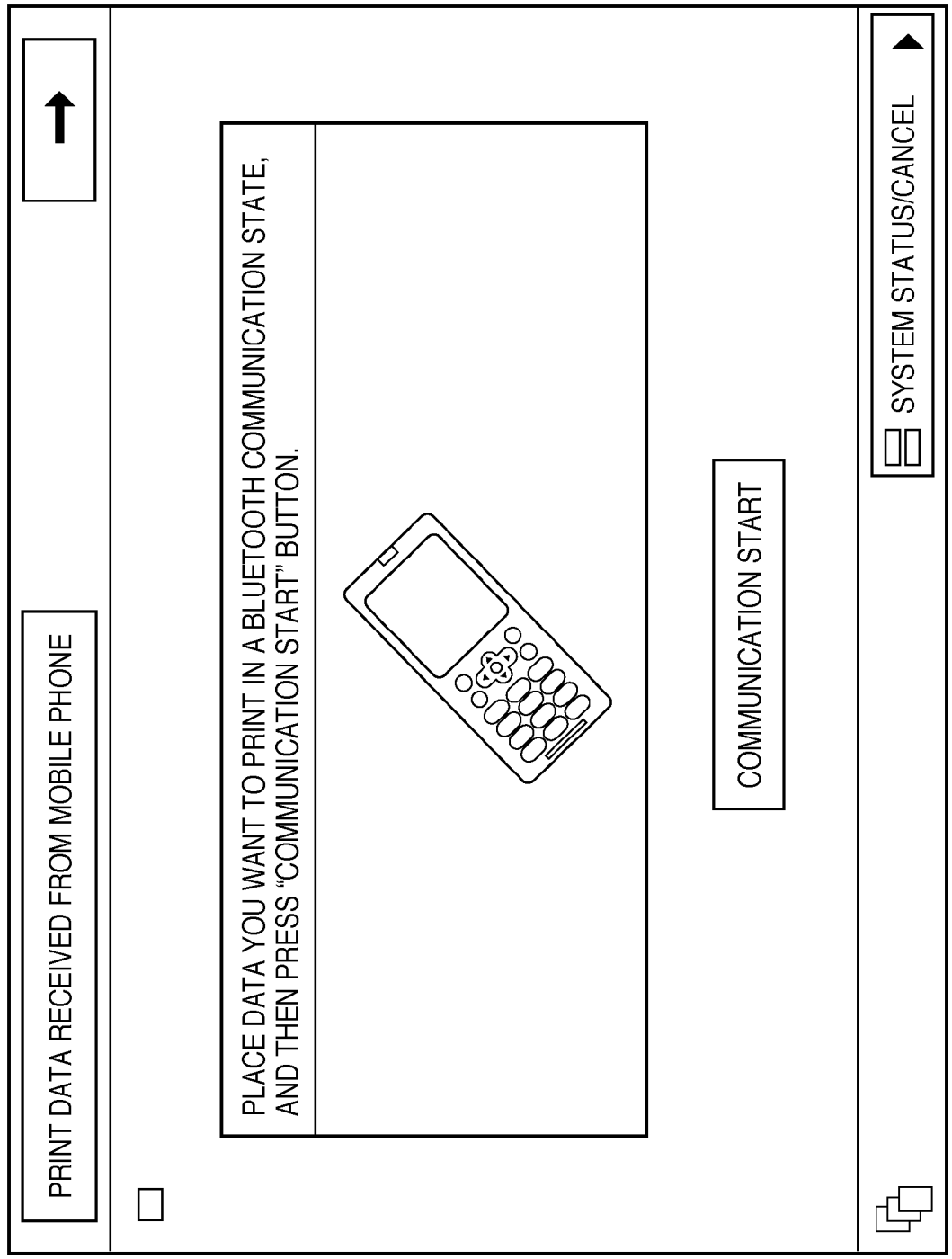
FIG. 4 is a diagram illustrating an example of a screen displayed on a display unit of a multifunction peripheral according to an embodiment of the present invention, in which a pre-communication screen is shown.

FIG. 4 is a diagram illustrating an exemplary screen displayed on the display unit 106 of the multifunction peripheral shown in FIG. 1. Pressing the communication start button displayed in this screen allows the multifunction peripheral to perform Bluetooth communication.

Figure 5:
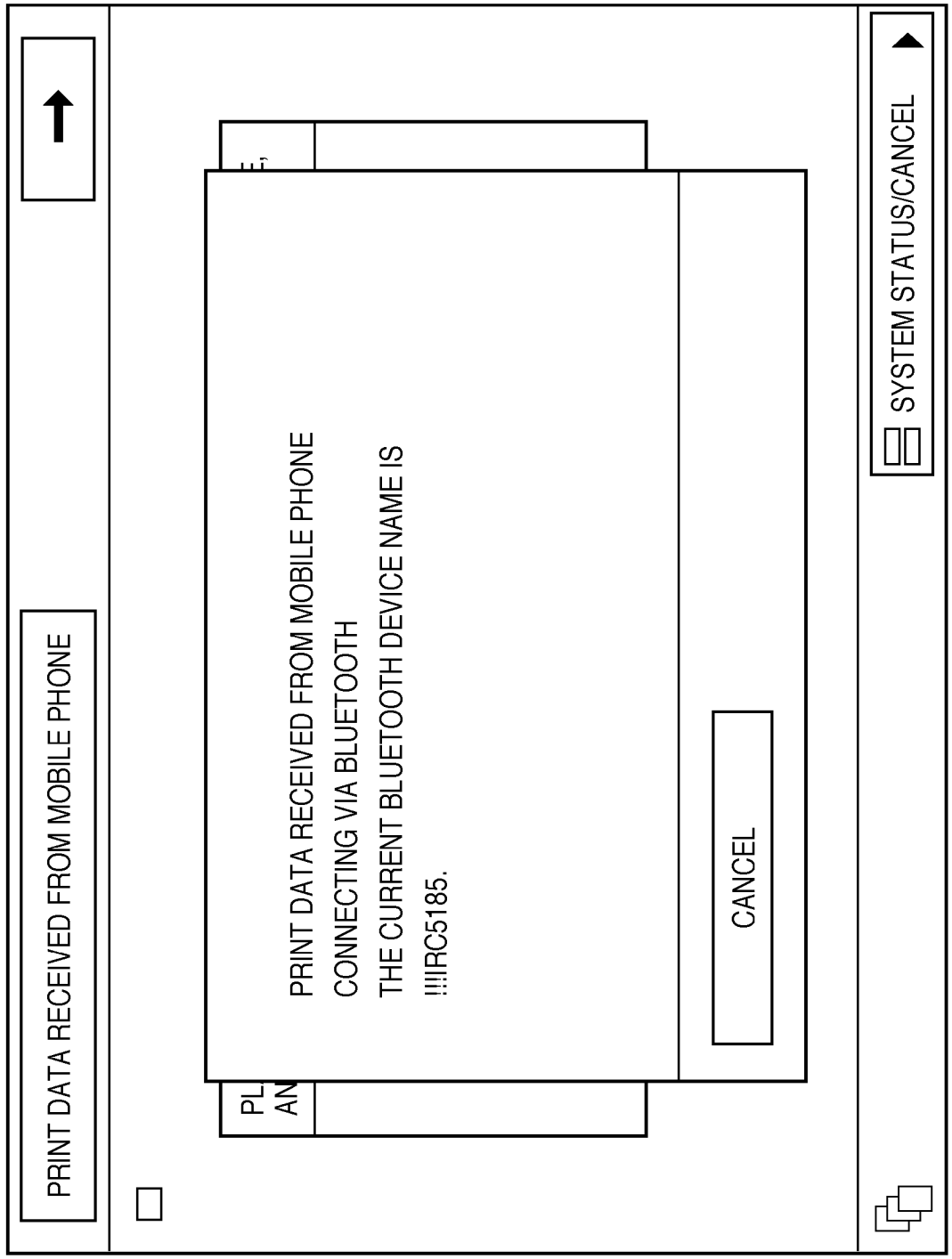
FIG. 5 is a diagram illustrating an example of a screen displayed on the display unit of a multifunction peripheral according to an embodiment of the present invention, in which a mid-communication screen is shown.

FIG. 5 is a diagram illustrating an exemplary screen displayed on the display unit 106, in which a screen indicating that the multifunction peripheral has started Bluetooth communication is shown. With this screen, the Bluetooth name of the multifunction peripheral can be easily understood.

Figure 6:
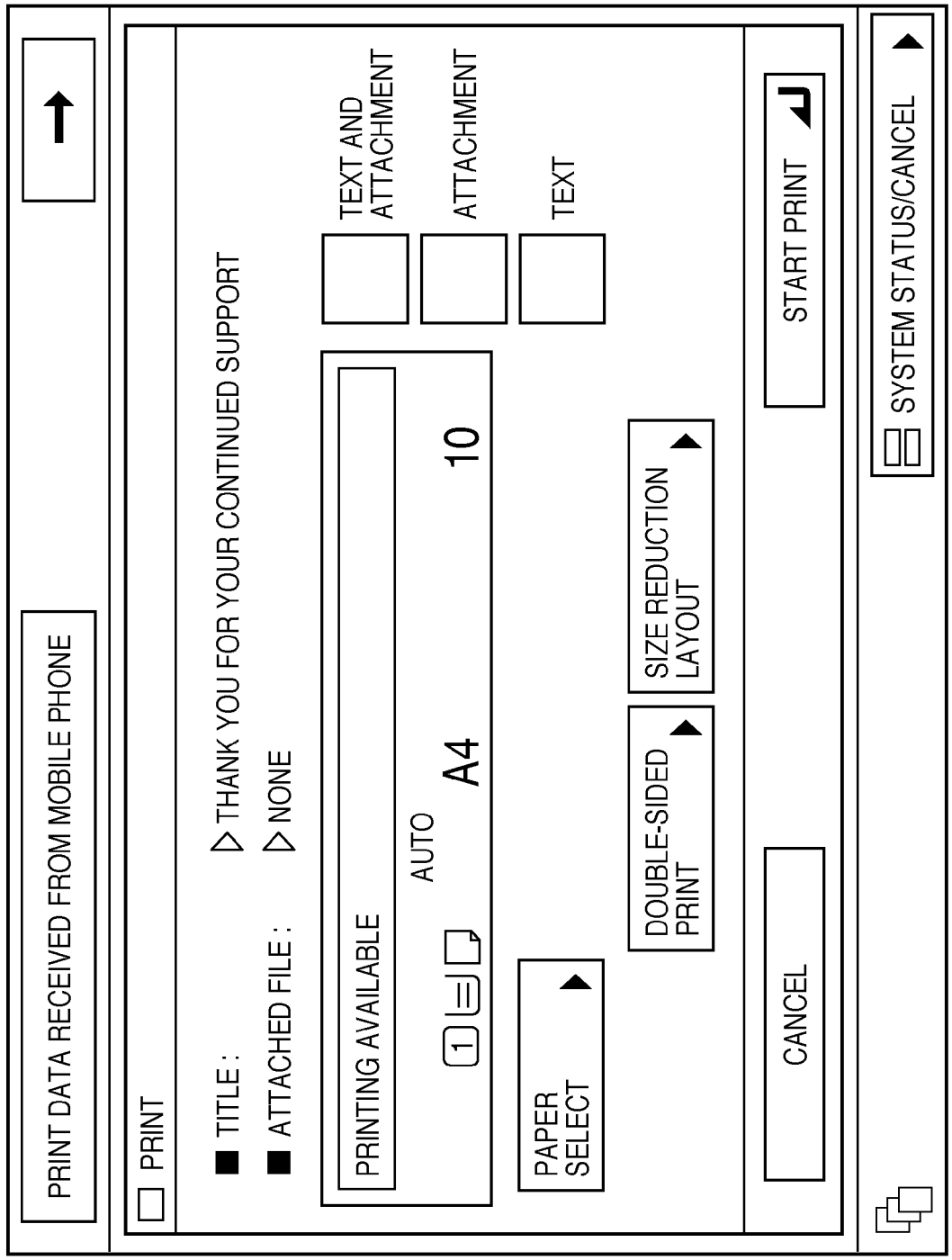
FIG. 6 is a diagram illustrating an example of a screen displayed on the display unit of a multifunction peripheral according to an embodiment of the present invention, in which a print settings screen is shown.

FIG. 6 is a diagram illustrating an example of a screen displayed on the display unit 106, in which an exemplary screen for configuring printing settings for data received by the multifunction peripheral through Bluetooth communication is shown. In the case where the mobile phone cannot send data together with the print settings, with this screen, it is possible to configure ordinary print settings such as specifying the number of copies, and selecting paper. In addition, in the case where the item to be printed is an email received by the mobile phone, it is possible to select to print only text, to print only an attached file, or to print both text and an attached file.

Figure 7:
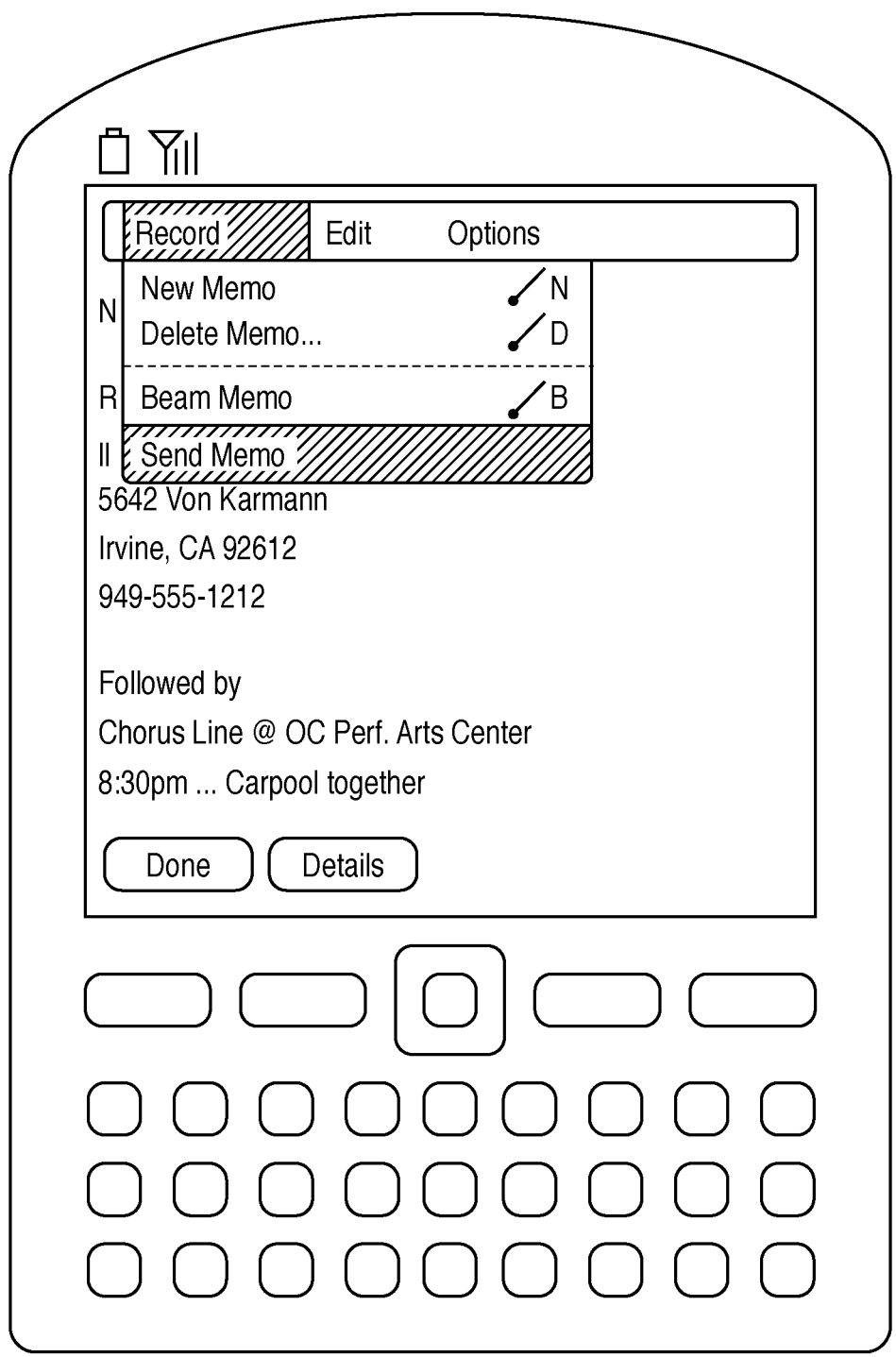
FIG. 7 is a diagram illustrating an example of a screen displayed on a display unit of a mobile phone according to an embodiment of the present invention, in which a pre-wireless communication screen is shown.

FIG. 7 is a diagram illustrating an example of a screen displayed on the display unit 206 of the portable terminal shown in FIG. 2, in which an exemplary screen when transmitting a document stored in the mobile phone to the multifunction peripheral using Bluetooth communication is shown. By selecting "Send Memo" from the menu displayed on this screen, it is possible to transmit the data.

Figure 8:
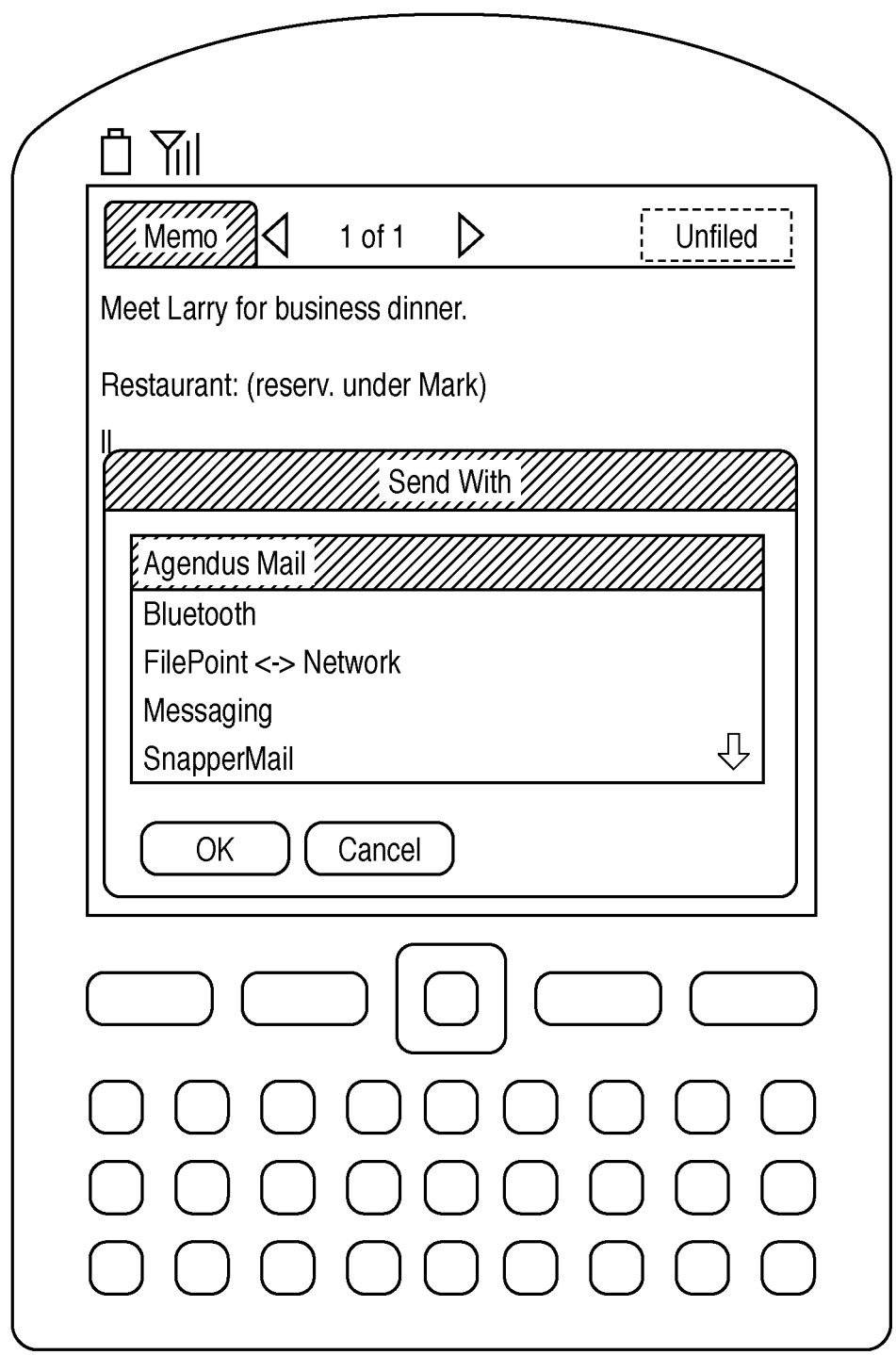
FIG. 8 is a diagram illustrating an example of a screen displayed on the display unit of a mobile phone according to an embodiment of the present invention, in which a screen for selecting the type of wireless communication is shown.

FIG. 8 is a diagram illustrating an example of a screen displayed on the display unit 206 shown in FIG. 2, in which an exemplary screen when transmitting a document stored in the mobile phone to the multifunction peripheral using Bluetooth communication. With this screen, it is possible to select various communication units. By selecting "Bluetooth" from the menu displayed on this screen, the document can be transmitted using Bluetooth.

Figure 9:
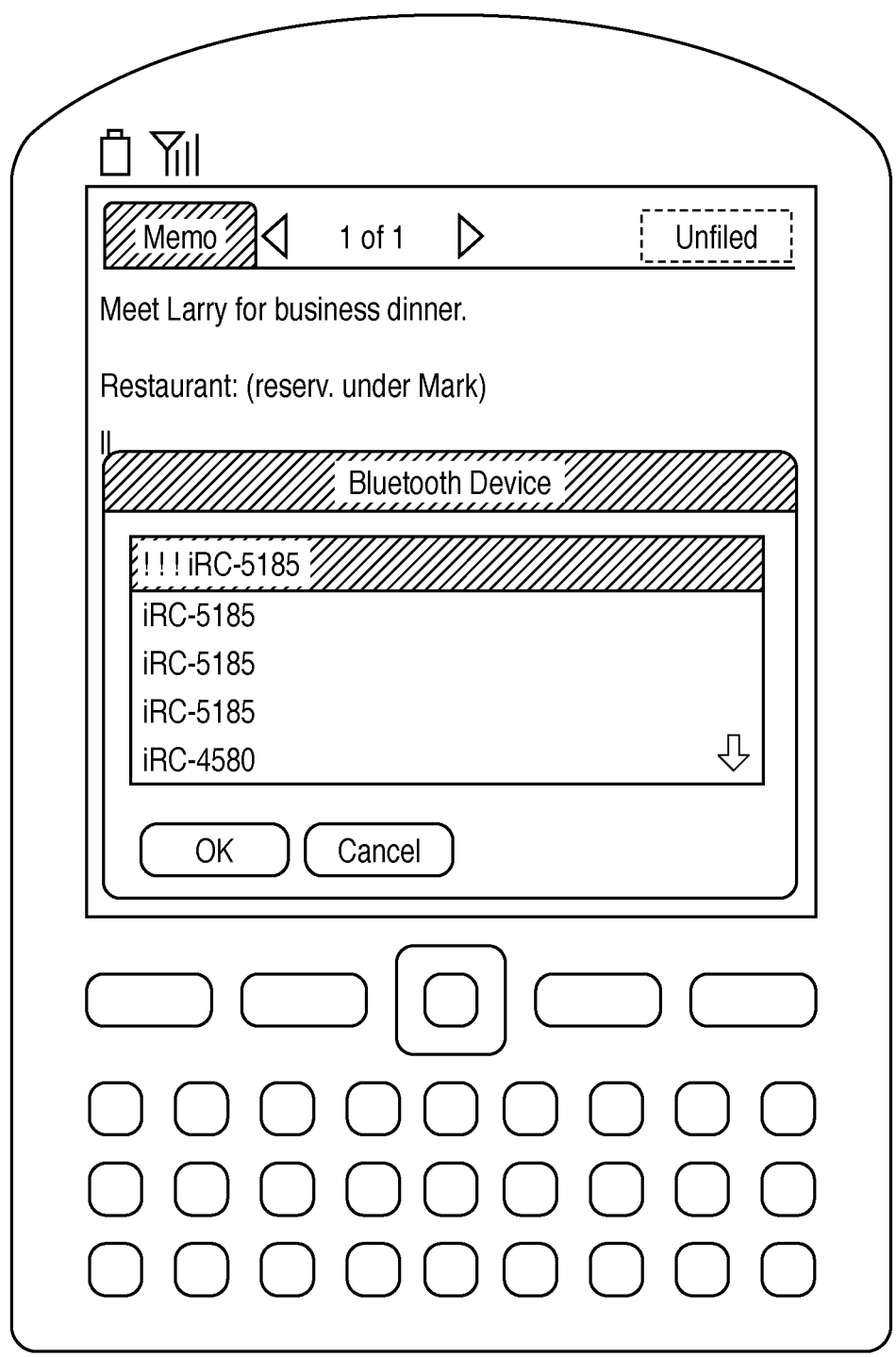
FIG. 9 is a diagram illustrating an example of a screen displayed on the display unit of a mobile phone according to an embodiment of the present invention, in which a screen showing the result of a search for Bluetooth devices is shown.

FIG. 9 is a diagram illustrating an example of a screen displayed on the display unit 206 shown in FIG. 2, in which an exemplary screen when transmitting a document stored in the mobile phone to the multifunction peripheral using Bluetooth communication is shown. This screen shows various Bluetooth devices that were found, and by selecting a desired Bluetooth device, printing is executed by the desired multifunction peripheral.

Figure 10:
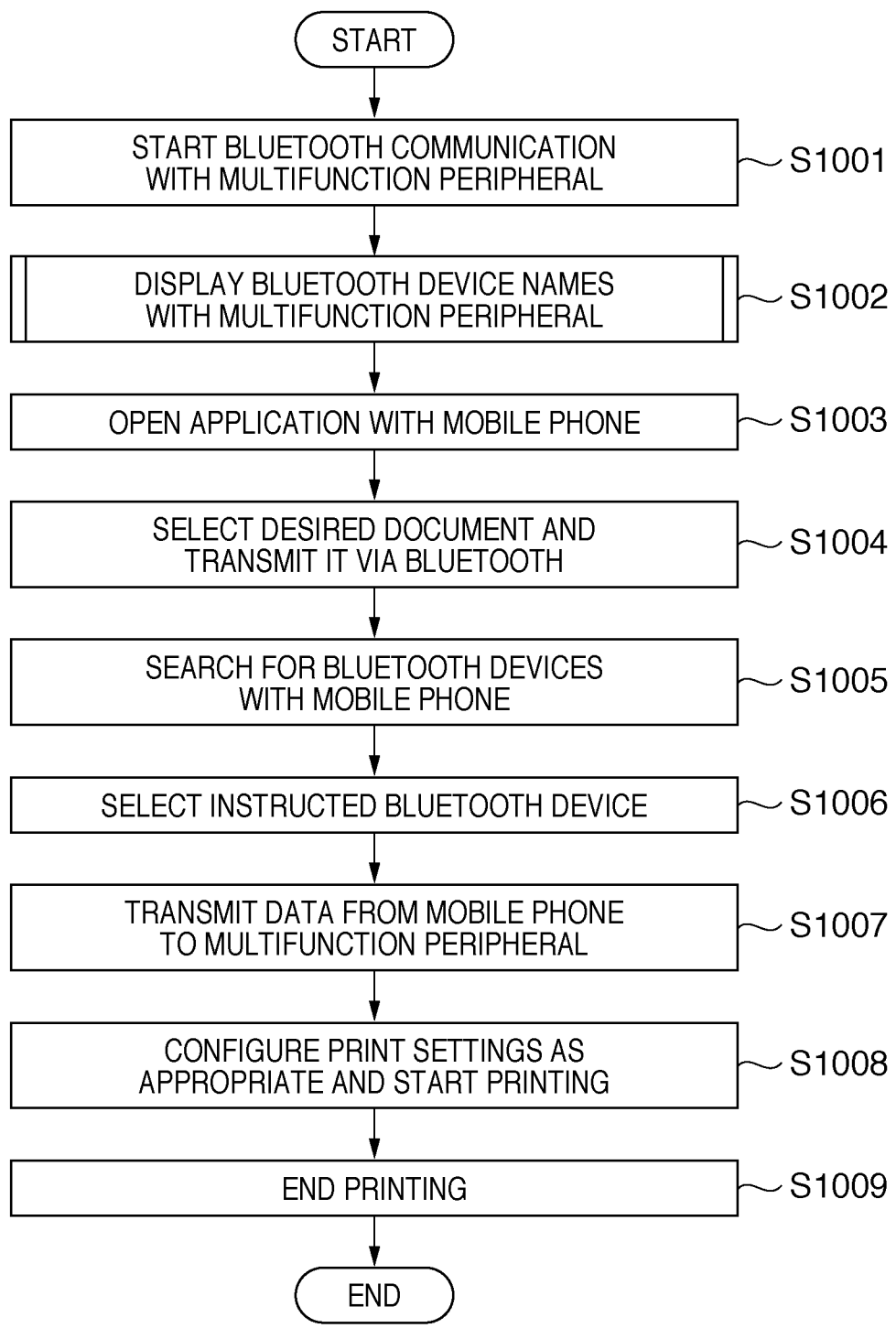
FIG. 10 is a flowchart illustrating an example of a process procedure performed by an image forming system according to an embodiment of the present invention.

FIG. 10 is a flowchart illustrating an exemplary flow of a data processing procedure performed by the multifunction peripheral and the portable terminal, according to the present embodiment.

A user who wants to print print data stored in the mobile phone on a multifunction peripheral moves to the front of the multifunction peripheral while carrying the mobile phone, and performs an operation to display the screen shown in FIG. 4 on the display unit of the multifunction peripheral. The CPU 101 of the multifunction peripheral detects that the communication start button has been pressed in the screen of FIG. 4 displayed on the display unit 102. Then, in step S1001, the multifunction peripheral starts Bluetooth communication under the control of the communication controller 108.

When the multifunction peripheral starts Bluetooth communication, in step S1002, the multifunction peripheral displays the screen shown in FIG. 5 on the display unit 106. Through this, the user is notified of the Bluetooth name of the multifunction peripheral.

Next, in response to an operation of the user, in order to specify print data stored in the mobile phone, in step S1003, the mobile phone starts an application. If the mobile phone has a system in which a list is displayed from the menu of the mobile phone, and print data can be specified without having to start an application that is dedicated to printing, the starting of the application is unnecessary.

Next, in step S1004, the mobile phone displays screens as shown in FIGS. 7 and 8 on the display unit 206. Then, in response to an operation of the user, a document to be transmitted via Bluetooth communication is specified, and the short range wireless communication unit 210 starts Bluetooth communication.

The mobile phone searches for Bluetooth devices that are present within the communication area (S1005). In order to prompt the user to decide on which Bluetooth device to connect to from among the Bluetooth devices that have been found, a list of device names as shown in FIG. 9 is displayed on the display unit 206. In this example, the Bluetooth device name of the multifunction peripheral is generated so as not to overlap with other Bluetooth device names. Accordingly, a plurality of Bluetooth names that are the same as the Bluetooth name of the multifunction peripheral displayed when the user pressed the communication start button will not appear in the device list.

The user confirms the Bluetooth device name of the multifunction peripheral by referring to the screen (FIG. 5) displayed on the display unit 103 of the multifunction peripheral, and selects the same Bluetooth device name from among the list displayed in the display unit 206 of the mobile phone. Through this, the desired multifunction peripheral is specified in the mobile phone. In response to such an operation of the user, the mobile phone specifies one Bluetooth device from the device list and establishes a connection (S1006).

Next, in step S1007, the mobile phone transmits data from the short range wireless communication unit 210 to the multifunction peripheral. Upon receiving the data, in step S1008, the multifunction peripheral displays the screen shown in FIG. 6 on the display unit 102, and print settings are configured as appropriate and printing is started. Then, in step S1009, printing ends.

Figure 11:
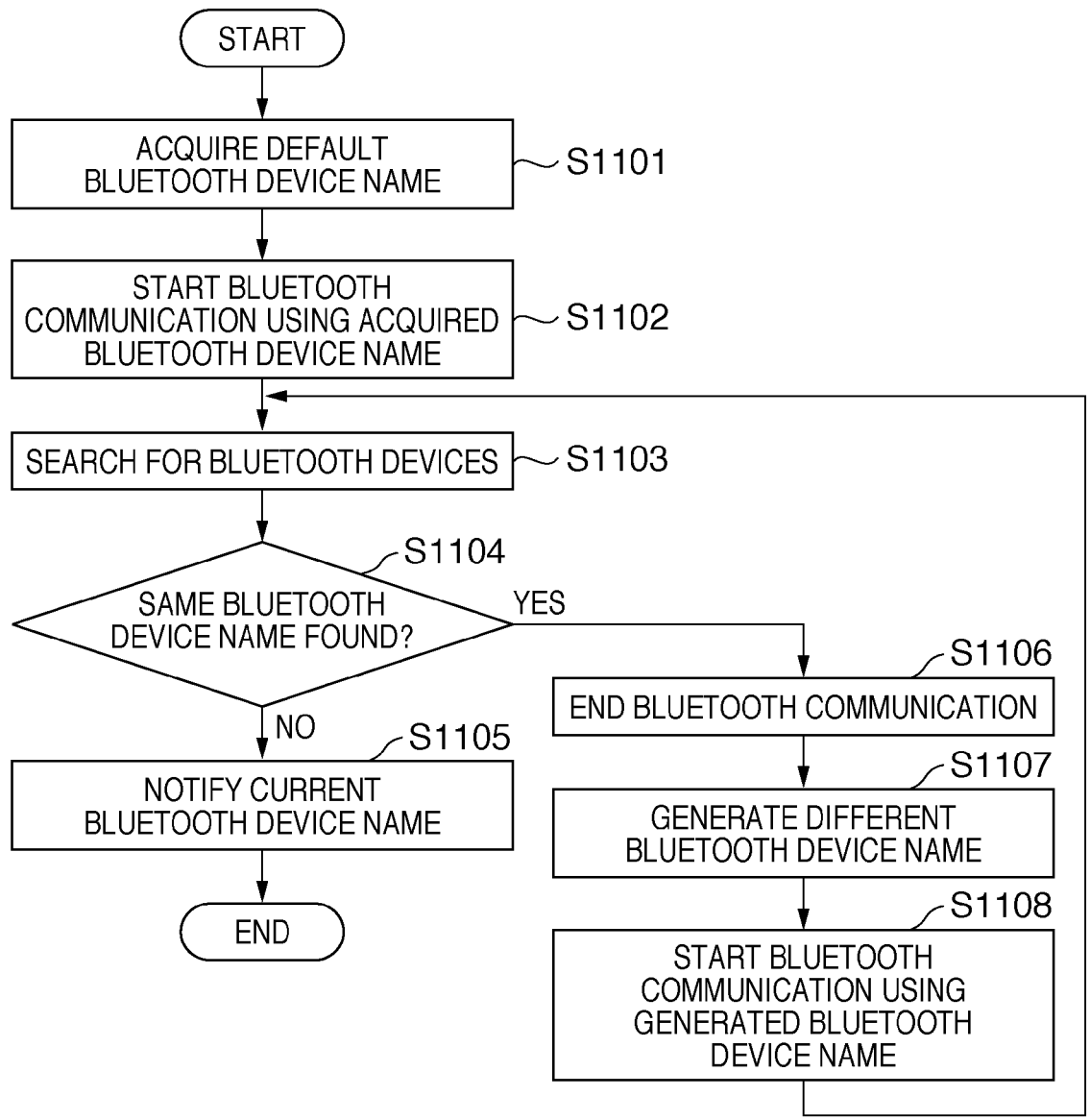
FIG. 11 is a flowchart illustrating an example of a process procedure for generating a Bluetooth device name performed by a multifunction peripheral according to an embodiment of the present invention.

The displaying method of Bluetooth device name performed in step S1002 of FIG. 10 will be described next in further detail. FIG. 11 is a flowchart illustrating a process for displaying Bluetooth device name. This process is executed by the CPU 101 of the multifunction peripheral processing a program recorded in a memory such as the ROM. This flow starts when the user presses the communication start button displayed on the screen of the multifunction peripheral.

First, in step S1101, in the multifunction peripheral, the CPU 101 functions as a first acquiring unit, and acquires the default Bluetooth device name from the ROM 102. Then, in step S1102, the communication controller 108 starts Bluetooth communication by using this Bluetooth device name.

In step S1103, the CPU 101 searches for Bluetooth devices. In step S1104, the CPU 101 functions as a search unit that searches for other information processing apparatuses capable of wireless communication, and determines whether there is a device whose name is the same as the default Bluetooth device name (the device name acquired in step S1101) in the devices that have been found. In step S1104, the CPU 101 functions as a second acquiring unit, and thus acquires second identification information (Bluetooth device name) as information for identifying other information processing apparatuses that were found. Then, the CPU 101 functions as a comparing unit, and compares the first identification information (the default Bluetooth device name) of the information processing apparatus for which the search is conducted with the second identification information. If second identification information that is the same as the first identification information is not found as a result of the comparison, it can be assumed that the default Bluetooth device name is the only Bluetooth device name that is present in the network. As used herein, "the only Bluetooth device name that is present in the network" does not mean that it is the only Bluetooth device name that is present within the entire network, but means that it is the only Bluetooth device name that is present within an area of the network in which Bluetooth communication is enabled by the multifunction peripheral. In this case, the procedure advances to step S1105, where the user is notified of the current Bluetooth device name (the device name acquired in step S1101) while keeping the connection using the current Bluetooth device name. This notification is performed by displaying the screen shown in FIG. 5 on the display unit 106.

If a device having a Bluetooth device name that is the same as the default Bluetooth device name is found as a result of the determination performed in step S1104, the procedure advances to step S1106, where the communication controller 108 temporarily terminates the Bluetooth communication. Then, the procedure advances to step S1107, where the CPU 101 generates a Bluetooth name that is different from the default Bluetooth device name.

Next, in step S1108, the communication controller 108 again starts Bluetooth communication by using the Bluetooth device name generated in step S1107, and the procedure returns to step S1103. In most cases, it can be assumed at this time that the generated Bluetooth device name is the only Bluetooth device name present in the network. However, there is a possibility that another device may start Bluetooth communication after the search, and for this reason, this loop is repeated until the generated device name is the only device name present in the network. In the case where another device has started Bluetooth communication after the search, a situation can occur in which that device (only the device that has started Bluetooth communication) is found upon another search. If such a situation occurs, there is a possibility that the device name of that device may overlap with the changed device name, and for this reason, a search is performed again.

There are many conceivable methods for generating a device name such that it is the only Bluetooth device name in the network performed in step S1107. An example of such a method is to preset candidates for the name. Another conceivable method is to add one character to the beginning of the default Bluetooth device name. With this method, it is effective to use "!", which is the character next to Space in the ASCII code order, as the character to add, so that the name to which "!" has been added comes to the top of the list displayed on the mobile phone when sorted (FIGS. 5 and 9).

With the above configuration, when a Bluetooth connection is made by the multifunction peripheral, the connection is established using a Bluetooth device name that is the only Bluetooth device name in the network, and that Bluetooth device name is displayed on the screen of the multifunction peripheral. As a result, it is possible to readily identify a desired multifunction peripheral. That is, it is possible to readily establish Bluetooth communication with a desired multifunction peripheral without having to add a special system to mobile phones.

In another embodiment, the mobile phone is operated in front of the multifunction peripheral, and the search area in which the multifunction peripheral can search and the area in which the mobile phone can search are almost overlapping.

However, a case can be conceived in which the user confirms the Bluetooth name displayed on the screen of the multifunction peripheral, and after that, he/she moves away from the multifunction peripheral while carrying and operating the mobile phone. In this case, the search area of the multifunction peripheral and the search area of the mobile phone will be quite different. That is, a device that cannot be found by the multifunction peripheral will be found by the mobile phone, and the Bluetooth device name generated by the multifunction peripheral may no longer be the only Bluetooth device name present in the network.

For example, referring to FIG. 12, a multifunction peripheral 1 can find a multifunction peripheral 2, a multifunction peripheral 3 and a mobile phone, whereas the mobile phone can find the multifunction peripheral 1, the multifunction peripheral 2 and a multifunction peripheral 4. That is, there is a possibility that the multifunction peripheral 1 may generate a Bluetooth device name that is the same as the Bluetooth device name of the multifunction peripheral 4, and the mobile phone may find devices having the same name and have trouble deciding which one to choose.

In view of a situation as described above, with a multifunction peripheral according to an embodiment of the present invention, the mobile phone can display the multifunction peripherals in a distinguishable manner even if a situation described above occurs.

Figure 13:
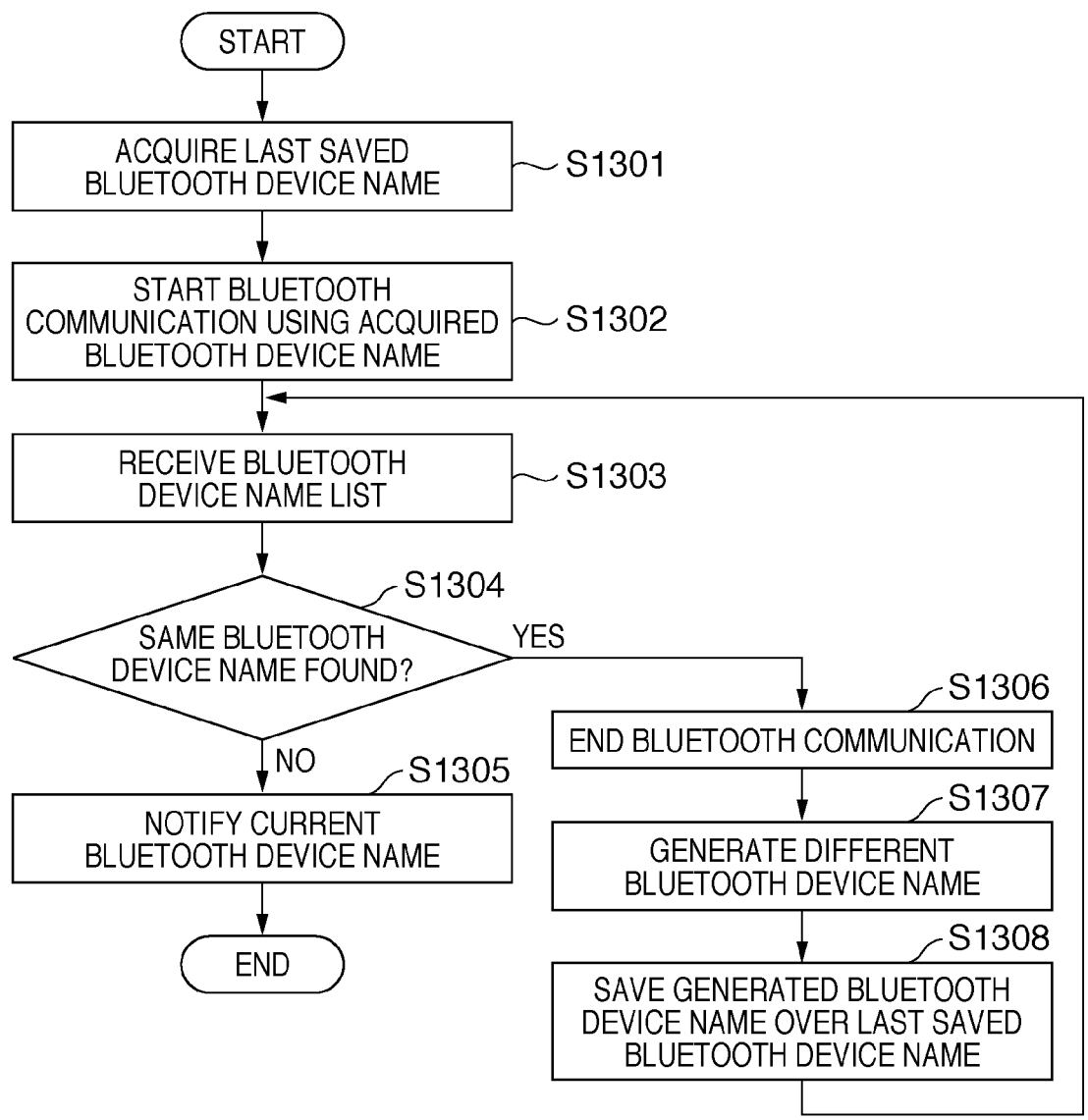
FIG. 13 is a flowchart illustrating an example of a process procedure for generating a Bluetooth device name performed by a multifunction peripheral according to an embodiment of the present invention.

FIG. 13 is a flowchart illustrating an example of a serial flow of a procedure for generating a Bluetooth device name that is the only Bluetooth device name in the network performed by the multifunction peripheral of an embodiment of the present invention. The steps indicated by reference numerals S1301 to S1308 shown in FIG. 13 are executed by the CPU 101 of the multifunction peripheral processing a program recorded in a memory such as the ROM, as is the case with FIG. 11.

Upon receiving a request to start a Bluetooth connection from the user, in step S1301, the CPU 101 acquires the last saved Bluetooth device name. As used herein, "the last saved Bluetooth device name" can be, for example, a Bluetooth device name used in the previous communication.

Next, in step S1302, the communication controller 108 starts Bluetooth communication by using the Bluetooth device name acquired in step S1301. The mobile phone, on the other hand, searches for Bluetooth devices that are present in its communication area, and then stores a list of Bluetooth device names of the Bluetooth devices that have been found, and transmits the list to the multifunction peripheral.

In step S1303 of FIG. 13, the communication controller 108 of the multifunction peripheral receives the Bluetooth device name list transmitted from the mobile phone. Then, in step S1304, the CPU 101 determines whether the list received in step S1303 includes a plurality of Bluetooth device names that are the same as the Bluetooth device name acquired in step S1301. That is, it is determined whether there are other multifunction peripherals in which a Bluetooth device name that is the same as the Bluetooth device name of the multifunction peripheral is set. If not found, the procedure advances to step S1305, where the user is notified of the currently set Bluetooth device name. If a plurality of Bluetooth device names that are the same as the Bluetooth device name of the multifunction peripheral are found in step S1304, the procedure advances to step S1306, where the Bluetooth communication is temporarily terminated, and then the procedure advances to step S1307.

In step S1307, a Bluetooth device name that is different from the Bluetooth device name with which the connection was established in step S1302 is generated, and the procedure advances to step S1308. In step S1308, the generated Bluetooth device name is saved over the last saved Bluetooth name, and thereby the Bluetooth device name is updated. Then, the procedure returns to step S1301.

With this configuration, even if devices having the same name are found when the user performs a Bluetooth device search using the mobile phone, different Bluetooth device names will be set. That is, in FIG. 12, different Bluetooth device names can be allocated to the multifunction peripheral 1 and the multifunction peripheral 4.

In step S1307, as a unit for generating a different Bluetooth device name, it is possible to add character information that is easily identified, such as "!", to the beginning of the previous Bluetooth device name. In this case, "!" is repeated by the number of times equal to the number of changes made to the Bluetooth device name.

To avoid this, it is possible to employ a configuration in which the termination of communication for the purpose of performing another search by the user and the termination of communication after data transfer is finished are distinguished, and after the termination of communication after data transfer is finished, the last saved Bluetooth device name is reset to the default value.

The foregoing has provided a detailed description of embodiments of the present invention. The present invention can be applied to a system configured with a plurality of devices, or can be applied to an apparatus configured with a single device. In addition, although the embodiments given above have been described specifically in the context of communication between a mobile phone and a multifunction peripheral, the present invention is not limited thereto, and can be applied to, for example, communication between multifunction peripherals, communication between mobile phones, communication between a mobile phone and a car navigation system, etc. The present invention can also be applied to communication between an information terminal, such as a personal computer, and a multifunction peripheral. In other words, the present invention is effective in any situations in which a plurality of the same type of information processing apparatuses are found as candidates with which wireless communication can be established, and the present invention produces an effect of readily identifying an information processing apparatus with which communication is established.

In the embodiment above, when the multi-function peripheral finds a device which has the same Bluetooth device name as that of the peripheral, the peripheral temporally generates a different Bluetooth device name. Alternatively, the present invention can be applied to identification information such as MAC address or communication address used in a short distance wireless communication network instead of Bluetooth device name. Furthermore, the Bluetooth device name and identification information can be displayed in a same screen of a mobile phone or the identification information simply disclosed on the screen. Under this situation, if a screen in FIG. 5 shows the identification, a user can easily distinguish the interested peripheral from the others. The identification information can be used only when the peripheral found a device which has the same Bluetooth device name as that of the peripheral or the identification information can also be used regardless of the timing when the peripheral found a device which has the same Bluetooth device name as that of the peripheral. By this feature, the objection of the present invention can be achieved without generating the temporal Bluetooth device name.

An embodiment of the present invention can also be achieved by directly or remotely supplying a program for achieving the functions of the embodiments described above to a system or an apparatus, and then having that system or apparatus read out and execute the program code that has been supplied. Consequently the program code itself that is installed on the computer in order to achieve the functional processing of the present invention on a computer also falls within the technical scope of the present invention.

In this case, as long as the program has the program function, the form in which it takes does not matter, and it may be object code, a program that is executed by an interpreter, script data that is supplied to an OS, or the like.

Examples of a recording medium for supplying the program include a Floppy® disk, a hard disk, an optical disk, and a magneto-optical disk. Other possibilities include an MO, a CD-ROM, a CD-R, a CD-RW, magnetic tape, a non-volatile memory card, a ROM, a DVD (DVD-ROM, DVD-R), and so on.

Furthermore, it is also possible to employ the method of connecting to an Internet website using the browser of a client PC and then downloading the program of the present invention itself, or a file that further includes an automatic installation function, onto a recording medium such as a hard disk. It is also possible to divide up the program code that constitutes the program according to the present invention into a plurality of files and then to download each of the files from different websites. In other words, a WWW server that allows a program for achieving the functional processing of the present invention on a computer to be downloaded by a plurality of users also falls within the scope of the present invention. It is also possible to encrypt the program according to the present invention and store it on a storage medium such as a CD-ROM, and distribute it to users. It is also possible to allow users who have satisfied predetermined conditions to download key information that decodes the encrypted program from a website via the Internet, and then, to execute the encrypted program by using that key information, and to install it on a computer.

The OS, or the like, that is running on the computer performs part or all of the actual processing based on the instructions from the program, and through that processing, it is also possible to achieve the functions of the embodiments discussed above.

In addition, a case in which the program according to the present invention is written into a memory that is provided in a function expansion unit of a PC, and then, based on that program, the CPU, or the like, provided in that function expansion unit performs part or all of the actual processing, also falls within the scope of the present invention.

According to the present invention, it is possible to provide a more easy-to-use wireless communication technique.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-036581 filed on Feb. 18, 2008, which is hereby incorporated by reference herein in its entirety.

What is claimed is:

1. An information processing apparatus comprising:
    a search unit configured to search for a first information processing apparatus which exists within a wireless communication area, wherein the information processing apparatus communicates with the first information processing apparatus within the wireless communication area;
    a first acquiring unit configured to acquire a device name of a second information processing apparatus, wherein the second information processing apparatus exists within the wireless communication area in which the first information processing apparatus communicates with the second information processing apparatus and the information processing apparatus is not able to communicate with the second information processing apparatus;
    a setting unit configured to set a device name of the information processing apparatus to be different than the device name of the second information processing apparatus acquired by the first acquiring unit; and
    a notification unit configured to notify a user of the device name of the information processing apparatus set by the setting unit.

2. The information processing apparatus according to claim 1, wherein the setting unit adds specific information to the device name of the information processing apparatus.

3. The information processing apparatus according to claim 2, wherein the specific information is character information and is added to the device name of the information processing apparatus so that the device name of the information processing apparatus is displayed on top of a list, and the list indicates device names of information processing apparatuses that are able to communicate with the information processing apparatus.

4. The information processing apparatus according to claim 1, wherein the search performed by the search unit, the acquirement of the device name performed by the first acquiring unit, and the setting performed by the setting unit are repeated after the device name of the information processing apparatus is set by the setting unit.

5. The information processing apparatus according to claim 1, further comprising a storage unit configured to store the device name of the information processing apparatus set by the setting unit,
    wherein the device name of the information processing apparatus stored in the storage unit is updated each time the device name of the information processing apparatus is set by the setting unit.

6. The information processing apparatus according to claim 1, further comprising a transmitting unit configured to transmit the device name of the information processing apparatus in response to a request from the first information processing apparatus.

7. The information processing apparatus according to claim 1, wherein the wireless communication is implemented with Bluetooth communication.

8. The information processing apparatus according to claim 1, wherein the information processing apparatus is a printer, the notification unit is a display unit included in the printer, and the search by the search unit and the acquirement by the first acquiring unit is performed when the printer receives a communication request from a wireless communication apparatus.

9. The information processing apparatus according to claim 1, further comprising a second acquiring unit configured to acquire a device name of the first information processing apparatus found by the search unit,
    wherein the setting unit sets the device name of the information processing apparatus to be different than the device name of the first information processing apparatus and the device name of the second information processing apparatus.

10. The information processing apparatus according to claim 1, further comprising a comparing unit configured to compare a default device name of the information processing apparatus with the device name of the second information processing apparatus,
    wherein the setting unit changes the device name of the information processing apparatus from the default device name to a device name which is different from the device name of the second information processing apparatus in a case where the default device name of the information processing apparatus and the device name of the second information processing apparatus are identical.

11. A control method of an information processing apparatus capable of wireless communication with a first information processing apparatus, the method comprising:
    searching for the first information processing apparatus which exists within a wireless communication area, wherein the information processing apparatus communicates with the first information processing apparatus within the wireless communication area;
    acquiring a device name of a second information processing apparatus, wherein the second information processing apparatus exists within the wireless communication area in which the first information processing apparatus communicates with the second information processing apparatus and the information processing apparatus is not able to communicate with the second information processing apparatus;

setting a device name of the information processing apparatus to be different than the device name of the second information processing apparatus; and notifying a user of the device name of the information processing apparatus.

12. A non-transitory computer-readable medium storing a computer-executable program for causing a computer to perform a control method of an information processing apparatus capable of wireless communication with a first information processing apparatus, the control method comprising:

searching for the first information processing apparatus which exists within a wireless communication area, wherein the information processing apparatus communicates with the first information processing apparatus within the wireless communication area;

acquiring a device name of a second information processing apparatus, wherein the second information processing apparatus exists within the wireless communication area in which the first information processing apparatus communicates with the second information processing apparatus and the information processing apparatus is not able to communicate with the second information processing apparatus;

setting a device name of the information processing apparatus to be different than the device name of the second information processing apparatus; and notifying a user of the device name of the information processing apparatus.

* * * * *